(12) United States Patent
Lee

(10) Patent No.: US 9,361,343 B2
(45) Date of Patent: Jun. 7, 2016

(54) METHOD FOR PARALLEL MINING OF TEMPORAL RELATIONS IN LARGE EVENT FILE

(71) Applicant: ELECTRONICS AND TELECOMMUNICATIONS RESEARCH INSTITUTE, Daejeon (KR)

(72) Inventor: Yong-Joon Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 293 days.

(21) Appl. No.: 14/049,963

(22) Filed: Oct. 9, 2013

(65) Prior Publication Data

US 2014/0207820 A1     Jul. 24, 2014

(30) Foreign Application Priority Data

Jan. 18, 2013    (KR) ........................ 10-2013-0006078

(51) Int. Cl.
    *G06F 17/30*        (2006.01)
    *G06F 17/00*        (2006.01)

(52) U.S. Cl.
    CPC .............................. *G06F 17/30539* (2013.01)

(58) Field of Classification Search
None
See application file for complete search history.

(56) References Cited

U.S. PATENT DOCUMENTS

| | | | |
|---|---|---|---|
| 6,665,669 B2 | 12/2003 | Han et al. | |
| 6,826,569 B2 | 11/2004 | Robertson | |
| 2010/0332540 A1* | 12/2010 | Moerchen | G06F 11/008 707/776 |
| 2012/0182891 A1 | 7/2012 | Lee et al. | |
| 2014/0019569 A1* | 1/2014 | Sharma | G06F 9/5066 709/208 |
| 2014/0074764 A1* | 3/2014 | Duftler | G06N 5/025 706/47 |
| 2014/0358926 A1* | 12/2014 | McGregor | G06F 19/322 707/737 |

FOREIGN PATENT DOCUMENTS

KR    10-2002-0051601 A     6/2002
KR    10-2012-0084100 A     7/2012

OTHER PUBLICATIONS

Chandramouli et al, Temporal Analytics on Big Data for Web Advertising, 2012.*
Laxman et al, A survey of temporal data mining, 2006.*
Papapetrou et al, Mining frequent arrangements of temporal intervals, 2009.*

(Continued)

*Primary Examiner* — Stanley K Hill
*Assistant Examiner* — Mikayla Chubb

(57) ABSTRACT

Disclosed herein is a method for parallel mining of temporal relations in a large event file using a MapReduce model. In the method for parallel mining of temporal relations in a large even file according to the present invention, an event file is sorted based on customer identification (ID) and event time at which each event has occurred. A set of large event types satisfying a preset support or more is generated from the event file. The event file is converted into a large event sequence including the large event type set. The large event sequence is summarized and then a time interval data file is created. Candidate temporal relations are generated from the time interval data file, and frequent temporal relations satisfying a preset support or more are derived from the candidate temporal relations. A temporal relation rule is generated from the derived frequent temporal relations.

13 Claims, 9 Drawing Sheets

(56) References Cited

OTHER PUBLICATIONS

Juan M. Ale et al., "An Approach to Discovering Temporal Association Rules", Proceedings of the 2000 ACM Symposium on Applied Computing, Mar. 19-21, 2000, pp. 294-300, vol. 1, Como, Italy.

Lingjuan Li et al., "The Strategy of Mining Association Rule Based on Cloud Computing", 2011 International Conference on Business Computing and Global Informatization (BCGIN), Jul. 29-31, 2011, pp. 475-478, Shanghai, China.

* cited by examiner

METHOD FOR PARALLEL MINING OF TEMPORAL RELATIONS IN LARGE EVENT FILE

CROSS REFERENCE TO RELATED APPLICATION

This application claims the benefit of Korean Patent Application No. 10-2013-0006078 filed on Jan. 18, 2013, which is hereby incorporated by reference in its entirety into this application.

BACKGROUND OF THE INVENTION

1. Technical Field

The present invention relates generally to a method for parallel mining of temporal relations in a large event file and, more particularly, to temporal data mining technology for mining useful temporal relations in parallel from a large event file having a temporal interval using a MapReduce model. The temporal relations in the present invention are represented by temporal interval algebra published by Allen, and include temporal relations, such as before, equal, meets, overlaps, during, starts, and finishes, wherein, for example, 'X during Y' means that X is generated during the period of event Y.

2. Description of the Related Art

Temporal data mining is technology for mining useful patterns from temporal data (event data), and includes sequential pattern mining, similar time series analysis, etc.

Sequential pattern mining refers to a method of mining patterns, in which specific item sets occur sequentially between transactions composed of item sets, and is configured to search for a pattern corresponding to a case where 50% of customers who lent product A subsequently lend products B and C.

Similar time series analysis refers to a method of searching time-series data, such as stock market behavior, for a pattern similar to that of a specific stock.

However, conventional methods are problematic in that, first, temporal data having only a time point of occurrence is handled, and it is difficult to mine useful patterns from data having a time interval.

For example, it is difficult to search for a useful temporal relation, such as a case where 50% of customers who lent product A lend product B during a lending period of product A, and then lend product C immediately after the termination of a lending period of product B. Second, temporal data is big data having an enormous capacity, and then immense expenses (data storage space and processing time) are required so as to store and process the big data and search for useful patterns. Consequently, the conventional methods are not suitable for application to big data.

For example, pieces of big data, such as web logs collected from websites a large number of users are visiting, life logs generated by collecting, in real time, personal activities and status information through sensors contained in smart phones, and health records generated by recording personal lifelong health conditions, are not suitable for analysis by existing methods.

U.S. Pat. No. 6,826,569 discloses technology for extracting patterns for sequential events that repeatedly occur in pieces of sequential data. However, the technology disclosed in this U.S. patent is limited in that various temporal relation rules cannot be mined in parallel from time interval data.

SUMMARY OF THE INVENTION

Accordingly, the present invention has been made keeping in mind the above problems occurring in the prior art, and an object of the present invention is to provide a temporal data mining method based on parallel processing, which can rapidly and inexpensively mine useful temporal relation rules in a large event file.

Another object of the present invention is to provide a method of rapidly and inexpensively mining temporal relation rules by efficiently storing and processing big data using a MapReduce model.

In order to accomplish the above objects, the present invention provides a method for parallel mining of temporal relations in a large even file, including aligning an event file based on customer identification (ID) and event time at which each event has occurred, generating a set of large event types satisfying a preset support or more from the event file, converting the event file into a large event sequence including the large event type set, summarizing the large event sequence and then creating a time interval data file; generating candidate temporal relations from the time interval data file, and deriving frequent temporal relations satisfying a preset support or more from the candidate temporal relations, and generating a temporal relation rule from the derived frequent temporal relations.

Preferably, aligning the event file may be configured to distribute and store the event file to and in a plurality of nodes using a distributed file system.

Preferably, generating the set of the large event types may be configured to determine a set of candidate event types, for which a total number of supporting customers is a preset minimum support or more, among one or more candidate event types to be the large event type set.

Preferably, the candidate event types may be extracted by processing the event file in parallel using a Map function, and supports of the candidate event types may be calculated in parallel using a Reduce function.

Preferably, converting the event file into the large event sequence may include extracting event records belonging to the large event types by processing the event file in parallel using a Map function, converting event times at which the events have occurred into sequence numbers, and generating the large event sequence by combining large event type sets, event times of which are converted into sequence numbers, in parallel using a Reduce function.

Preferably, converting the event times at which the events have occurred into the sequence numbers may include converting the event times at which the events have occurred into sequence numbers based on a preset time unit, and calculating periods from a preset reference time point to the converted event times, thus generating sequence numbers.

Preferably, the large event sequence may include event types and sequence numbers of the event types.

Preferably, creating the time interval data file may include calculating frequencies of one or more large event types occurring within a time window having a preset size, and generating a set of uniform event types by selecting large event types, frequencies of which are a preset minimum frequency or more, and creating a time interval data file including the uniform event type set.

Preferably, the time interval data file may be a set of records, each including fields corresponding to a customer ID, a start point of a time interval, an end point of the time interval, and an event type.

Preferably, the event file may be summarized to the time interval data file with reference to the uniform event type set, and may be distributed to and stored in a plurality of nodes through a distributed file system.

Preferably, the event file may be a set of event records, each including fields corresponding to a customer ID, an event time, and an event type set.

Preferably, deriving the frequent temporal relations may be configured to determine a set of candidate temporal relations, for which a total number of supporting customers is a preset minimum support or more, among one or more candidate temporal relations, is determined to be a frequent temporal relation set.

Preferably, the candidate temporal relations may be generated in a tree shape in such a way as to increase a support if an existing temporal relation is present while the time interval data file is scanned, and add a node and a connection line in which a new temporal relation is generated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
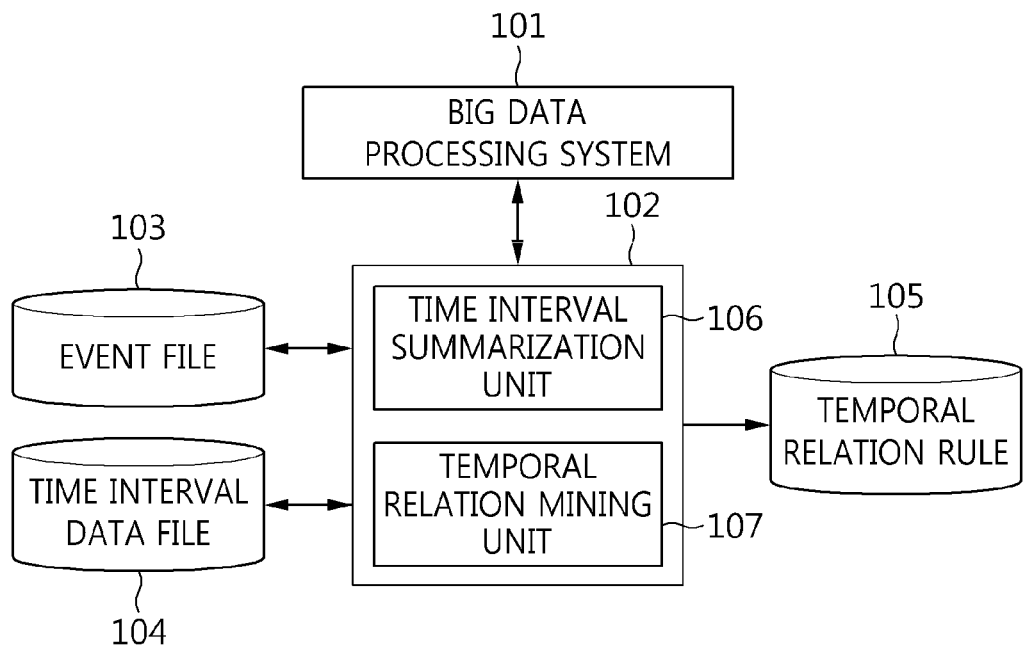
FIG. 1 is a diagram showing the configuration of an apparatus for parallel mining of temporal relations in a large event file according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a diagram showing the configuration of an apparatus for parallel mining of temporal relations in a large event file according to an embodiment of the present invention.

Referring to FIG. 1, an apparatus 102 for parallel mining of temporal relations in a large event file according to the embodiment of the present invention (hereinafter referred to as a "Temporal Relation Mining (TRM) apparatus") is operated in conjunction with a big data processing system 101, and includes a time interval summarization unit 106 and a temporal relation mining unit 107.

The big data processing system 101 provides a distributed file system for distributing and storing an event file 103 and a time interval data file 104 to and in a plurality of nodes (computers), and may provide a MapReduce function so that tasks for generating temporal relation rules in conjunction with the time interval summarization unit 106 and the temporal relation rule generation unit 107 can be processed in parallel.

In this case, the TRM apparatus 102 may receive the event file 103 and the time interval data file 104, and output a temporal relation rule 105.

Here, the event file 103 may be composed of sets of event records, each including {customer ID, event time, event type set} fields.

Each event record may be represented by $\{C_{id}, t, \{E_1, E_2, \ldots, E_n\}\}$.

Examples of the event file 103 may include web logs, health records, etc., and examples of event type include visiting web pages, patients' symptoms, etc.

Here, the time interval data file 104 may be composed of sets of records, each including {customer ID, start point of time interval, end point of time interval, event type} fields. The time interval data file 104 is represented by event sequence $S=\{(E_1, vs_1, ve_1), (E_2, vs_2, ve_2), \ldots, (E_n, vs_n, ve_n)\}$, where vs and ve are constants.

The temporal relation rule 105 is a rule composed of temporal relations between events, and is defined as follows.

The temporal relation rule is represented by $TR(e_1, e_2, e_3) = R_1(e_i, e_2)|supp(R_1) \wedge R_2(e_2, e_3)|supp(R_2) \wedge R_3(e_1, e_3)|supp(R_3)$. Temporal relation R includes relations between events, such as before, equal, meets, overlaps, during, starts, and finishes relations.

That is, the temporal relation rule may be represented by a connection between temporal relations R generated from any event set $\{e_1, e_2, e_3\}$, and the support of $R_1(x,y)$ is defined by $Supp(R_1)$, which denotes the total number of customers including the relation $R_1(x,y)$ in the event file.

The time interval summarization unit 106 of the TRM apparatus 102 may receive the event file 103 as input and output the time interval data file 104.

Figure 2:
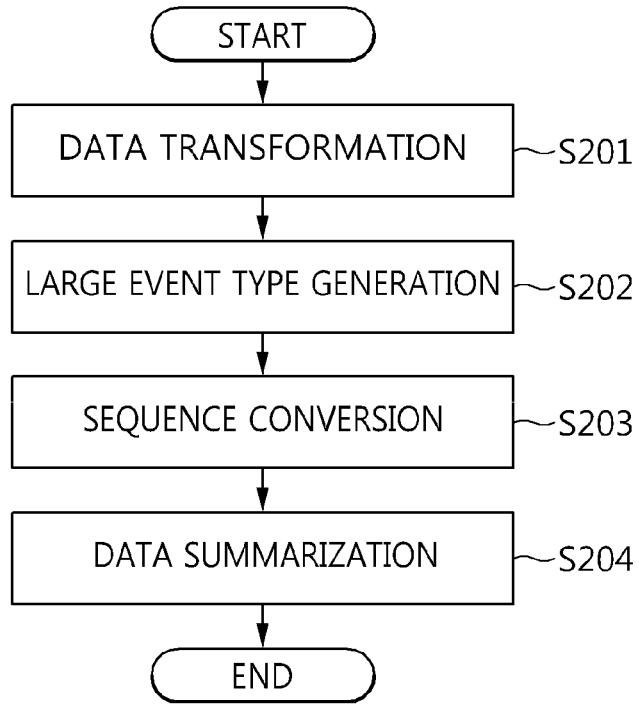
FIG. 2 is a diagram showing a data transformation and summarization procedure performed by a time interval summarization unit according to an embodiment of the present invention.

In order to describe the detailed operating principle of the time interval summarization unit 106, FIG. 2 is referred to. That is, the time interval summarization unit 106 performs a procedure including transformation step S201, large event type generation step S202, sequence conversion step S203, and data summarization step S204.

First, the time interval summarization unit 106 aligns the event file 103 in the sequence of (customer ID, event time) at step S201.

Next, sets of Large Event types (LE) satisfying a predetermined support or more are generated from the sorted event file 103 at step S202.

In this case, LE may be defined as follows.

Customers present in the event file are $C=\{C_1,C_2,\ldots C_n\}$, and an event sequence at this time is $S(C)=\{S(C_1), S(C_2), \ldots, S(C_n)\}$.

In this regard, all event types included in any sequence $S(C_{id})$ are called candidate event types (CE).

If an arbitrary candidate event type $E_i$ occurs in $S(C_{id})$, it is stated that customer $C_{id}$ causing $E_i$ supports $E_i$.

Even if $E_i$ of a plurality of events belonging to customer $C_{id}$ has occurred several times, it is considered that $E_1$ has occurred once.

The support of $E_i$ is called $Supp(E_i)$, which denotes the total number of customers supporting $E_i$ in the event file.

If, for a minimum support $Supp_{min}$ designated by the user, $Supp(E_i) \geq Supp_{min}$ is satisfied, it is stated that $E_i$ is a large event type (LE), and event $e_i$ having $E_i$ is a large event.

$Supp_{min}$ denotes the ratio of the number of supporting customers to the total number of customers.

For example, if there are 500 customers, $Supp_{min}$ is 40%, and $Supp(E_i)$ is 200, $E_i$ is LE. From the event file D, $LE=\{LE_1, LE_2, \ldots, LE_n\}$ can be obtained.

Thereafter, the event file 103 is converted into a sequence $S=\{e_1,e_2,\ldots,e_n\}$ including only LE at step S203.

When a time unit U and a reference time point V are given, the event file 103 composed of event records $\{C_{id}, t, \{E_1, E_2, \ldots E_n\}\}$ is converted into a large event sequence $S=\{(E_1, s_1),(E_2,s_2),\ldots,(E_n,s_n)\}$, and time t at which e occurs is converted into a sequence number s.

For example, if it is assumed that the time unit U is month, and the reference time point V is Jan. 1, 2012, event records {101, 2012-02-11, {D,A,E}} and {102, 2012-06-21, {C,E, G}} are converted into a sequence {(D,2),(E,2),(C,6),(E,6)}.

That is, an event set {D,A,E}, which is caused by user 101 on Feb. 11, 2012, belongs to a time interval from February 1 and February 29, and the time unit U is month, so the time is converted into February. Further, since V is January, 2012, and the event time is recognized as a second month based on V, sequence number 2 is calculated, and the event set is converted into a large event sequence {(D,2),(E,2)}.

Thereafter, sequence S is summarized, and then the time interval data file 104 is created at step S204.

A method of summarizing S will be specified as follows.

$S=\{(E_1,t_1),(E_2,t_2),\ldots,(E_n,t_n)\}$ is converted into sequence $S'=\{(E_1,vs_1,ve_1),(E_2,vs_2,ve_2),\ldots,(E_n,vs_n,ve_n)\}$ having a time interval.

However, $vs_i$ and $ve_i$ denote sequence numbers, and $ve_i \leq vs_i+1$ is satisfied. The period of S', that is, [1,m], denotes an overall period from a time point at which a first large event occurred in D to a time point at which a last large event occurred.

A time window size designated by the user is defined as w, and any window having the size w is defined as W.

However, w is an integer, and $w \geq ve_i - vs_i$, where i=1, n. In this case, the number of windows of S' is w, and window sequence $\{W_1, W_2, \ldots, W_n\}$ is present.

If a large event type $E_i$ is present within any window $W_1$ belonging to S', it is stated that $E_1$ has occurred in $W_1$. The frequency of $E_1$ is defined as $Freq(E_1)$, which denotes the number of windows in which $E_1$ occurs for the window sequence $\{W_1, W_2, \ldots, W_n\}$ in S'. If $Freq(E_i) \geq Freq_{min}$ is satisfied for designated minimum frequency $Freq_{min}$, $E_i$ is defined as uniformly occurring in the period [1,m] of S', and $E_i$ is called a uniform event type (UE).

For example, if there are 10 windows having a window size of 5 in the lifespan period [1, 50] of $E_1$, $Freq_{min}$ is 50%, and $Freq(E_1)$ is 6, $E_1$ is a uniform event type.

After a set of uniform event types $UE=\{UE_1, UE_2, \ldots, UE_n\}$ has been obtained from the sequence S', a time interval data file ND is created using S' including only UE.

For example, if customer $C_1$ purchased product A in January, April, and July, a time unit is month, and a window size is a quarter, the customer $C_1$ purchased product A in three of four quarters, and then Freq(A) is 3. If $Freq_{min}$ is 50%, A is a uniform event type (UE), so that product A is regarded as being purchased from January to July, and a file summarized to {A,[1,7]} is created.

Meanwhile, the temporal relation mining unit 107 of the TRM apparatus 102 receives the time interval data file 104 as input, and outputs a temporal relation rule 105.

Figure 3:
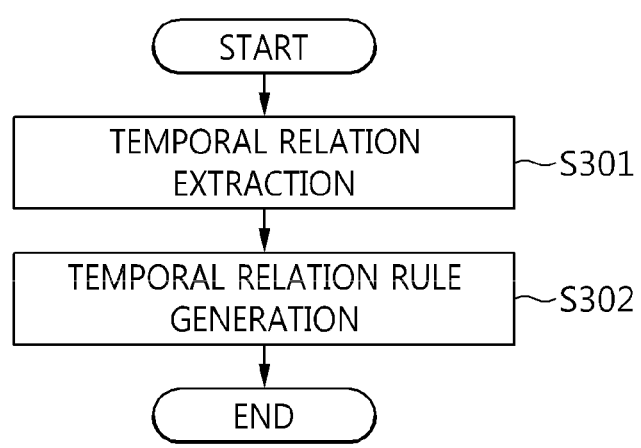
FIG. 3 is a diagram showing a rule generation procedure performed by a temporal relation mining unit according to an embodiment of the present invention.

In order to describe the operating principle of the temporal relation mining unit 107, FIG. 3 is referred to. That is, the temporal relation mining unit 107 is configured to perform a procedure including temporal relation extraction step S301 and temporal relation rule generation step S302.

First, the temporal relation mining unit 107 generates all candidate temporal relations R(x,y) from the time interval data file 104, and the candidate temporal relations are defined as follows.

A set of temporal relations $CR=\{R_1(x,y),R_2(x,y),\ldots,R_k(x,y)\}$ may be obtained from a time interval data file ND, wherein R(x,y) is called a candidate temporal relation (CR).

From an event set $IE(C_1)=\{e1,e2,e3\}$ of user $C_1$ included in ND, a set of candidate temporal relations {before(e1,e2), overlap(e2,e3), before(e1,e3)} can be obtained. This is called the customer temporal relation of $C_{id}$, that is, $CR(C_{id})$.

If the customer temporal relation $CR(C_{id})$ includes candidate temporal relation $R_1(x,y)$, it is stated that the customer $C_{id}$ supports $R_1(x,y)$.

Even if $R_1(x,y)$ of a plurality of events belonging to $C_{id}$ has occurred several times, it is regarded as having occurred only once.

The support of $R_1(x,y)$ is defined as $Supp(R_1)$, which denotes the number of customers who support $R_1(x,y)$ in the time interval data file ND.

If, for an arbitrarily designated minimum support $Supp_{min}$, $Supp(R_1) \geq Supp_{min}$ is satisfied, $R_1(x,y)$ is called a frequent temporal relation (FR).

For example, if there are 200 users, $Supp_{min}$ is 30%, and $Supp(R_1)$ is 100, $R_1(x,y)$ is a frequent temporal relation (FR).

Thereafter, the temporal relation mining unit 107 obtains a set of frequent temporal relations R(x,y) satisfying a support of $Supp_{min}$ or more, and generates a temporal relation rule TR from the set at step S302.

For example, $TR(e_1,e_2,e_3)=R_1(e_1,e_2)|supp(R_1) \wedge R_2(e_2,e_3) |supp(R_2) \wedge R_3(e_1,e_3)|supp(R_3)$ is generated from the frequent temporal relation (FR) created based on the event set $(e_1,e_2,e_3)$.

Figure 4:
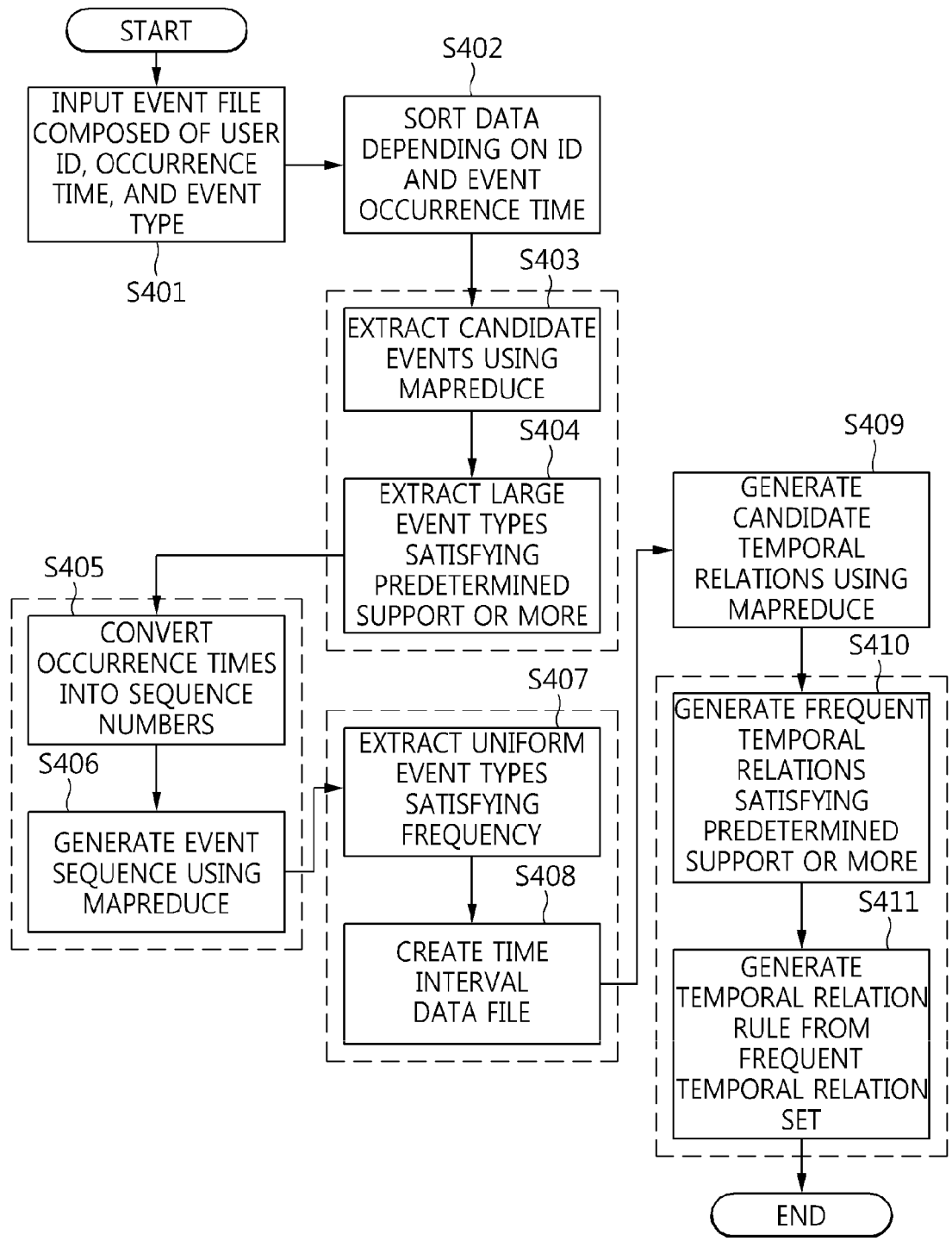
FIG. 4 is a diagram showing a method for parallel mining of temporal relations in a large event file according to an embodiment of the present invention.

FIG. 4 is a flowchart showing a method for parallel mining of temporal relations in a large event file according to an embodiment of the present invention.

In detail, FIG. 4 illustrates an algorithm for operating the time interval summarization unit 106 and the temporal relation mining unit 107 of FIG. 1, upon mining temporal relation rules in an event file according to an embodiment of the present invention.

Referring to FIG. 4, an event file $\{C_{id},t,\{E_1,E_2,\ldots,E_n\}\}$ 103 having an occurrence time is received as input data at step S401.

Thereafter, the event file 103 is sorted in the sequence of (customer ID, event time), and is stored in storage at step S402. A large event file may be distributed to and stored in a plurality of nodes using a distributed file system (for example, a Hadoop Distributed File System: HDFS). Thereafter, the event file is processed in parallel using a Map function to extract a set of candidate event types (CE), and the supports of CE are calculated in parallel using a Reduce function at step S403.

Thereafter, a set of large event types (LE) satisfying a predetermined support or more is extracted from CE at step S404.

A procedure at steps S403 and S404 will be described in detail later with reference to FIG. 5.

Thereafter, the map function is used to extract event records belonging to LE by processing the event file in parallel, and another function is used to convert event times into sequence numbers at step S405.

A Reduce function is used to combine LE sets, the event times of which are converted into sequence numbers, in parallel, and then a sequence is generated at step S406.

A procedure at steps S405 and S406 will be described later with reference to FIG. 6.

Next, the sequence is divided into windows, and the frequencies of LE occurring in each window are calculated, and thereafter uniform event types having a minimum frequency $Freq_{min}$ or more are searched for at step S407.

For example, UE satisfying a frequency of 33% or more is extracted from sequence S, which means that UE has occurred in two or more of a total of six windows having a window size of 2.

Thereafter, if UE has been extracted, event file D is summarized to a time interval data file $\{C_{id},vs,ve,E\}$ with reference to UE, and is distributed to and stored in a plurality of nodes through a distributed file system.

Thereafter, a time interval data file $\{C_{id},vs,ve,E\}$ is created by using the time interval data file $\{C_{id},vs,ve,E\}$ as input data at step S408.

A procedure at steps S407 and S408 will be described in detail later with reference to FIG. 7.

Thereafter, a Map function is used to obtain candidate temporal relation sets in parallel using a temporal relation table from the time interval data file $\{C_{id},vs,ve,E\}$, and a Reduce function is used to calculate the supports of CRs in parallel at step S409.

A procedure at step S409 will be described in detail later with reference to FIG. 8.

Thereafter, frequent temporal relations are obtained from the generated candidate temporal relations at step S410, and a temporal relation rule is generated from the frequent temporal relations at step S411.

A procedure at steps S410 and S411 will be described in detail later with reference to FIG. 9.

Figure 5:
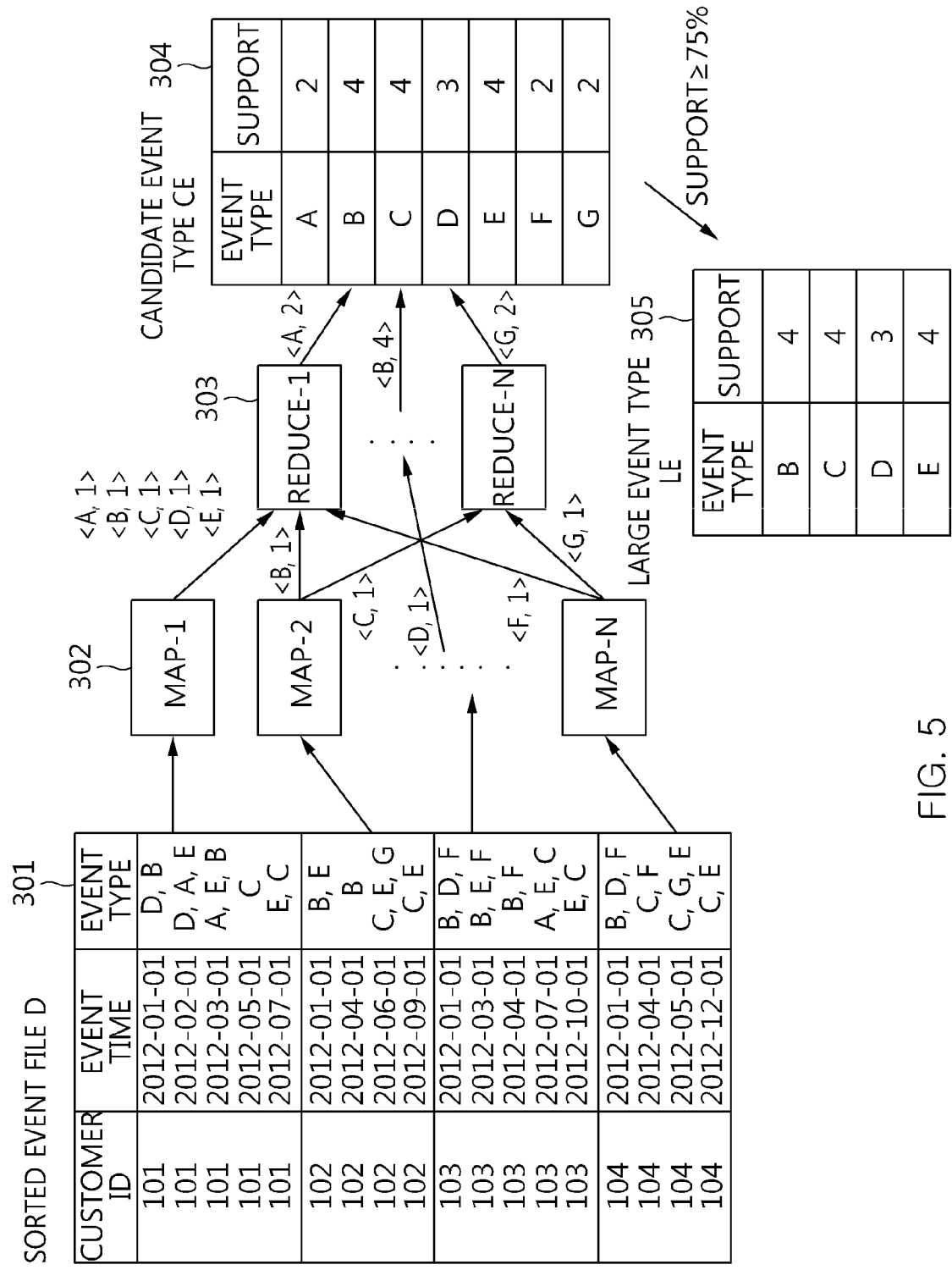
FIG. 5 is a diagram showing processing logic for performing a large event type generation step according to an embodiment of the present invention.

FIG. 5 is a diagram showing processing logic for performing the large event type generation step according to an embodiment of the present invention.

Referring to FIG. 5, Map functions 302 are used to process an event file D 301 in parallel to extract a candidate event type set 304 CE={A,B,C,D,E,F,G}, and Reduce functions 303 are used to calculate the supports of CE in parallel.

A large event type set 305 LE={B,C,D,E} satisfying a support of 75% or more is extracted from the CE set, which means that three or more of a total of four users include LE.

At sequence conversion step S203 performed by the time interval summarization unit 106, the event file is converted into a sequence S including only LE.

Figure 6:
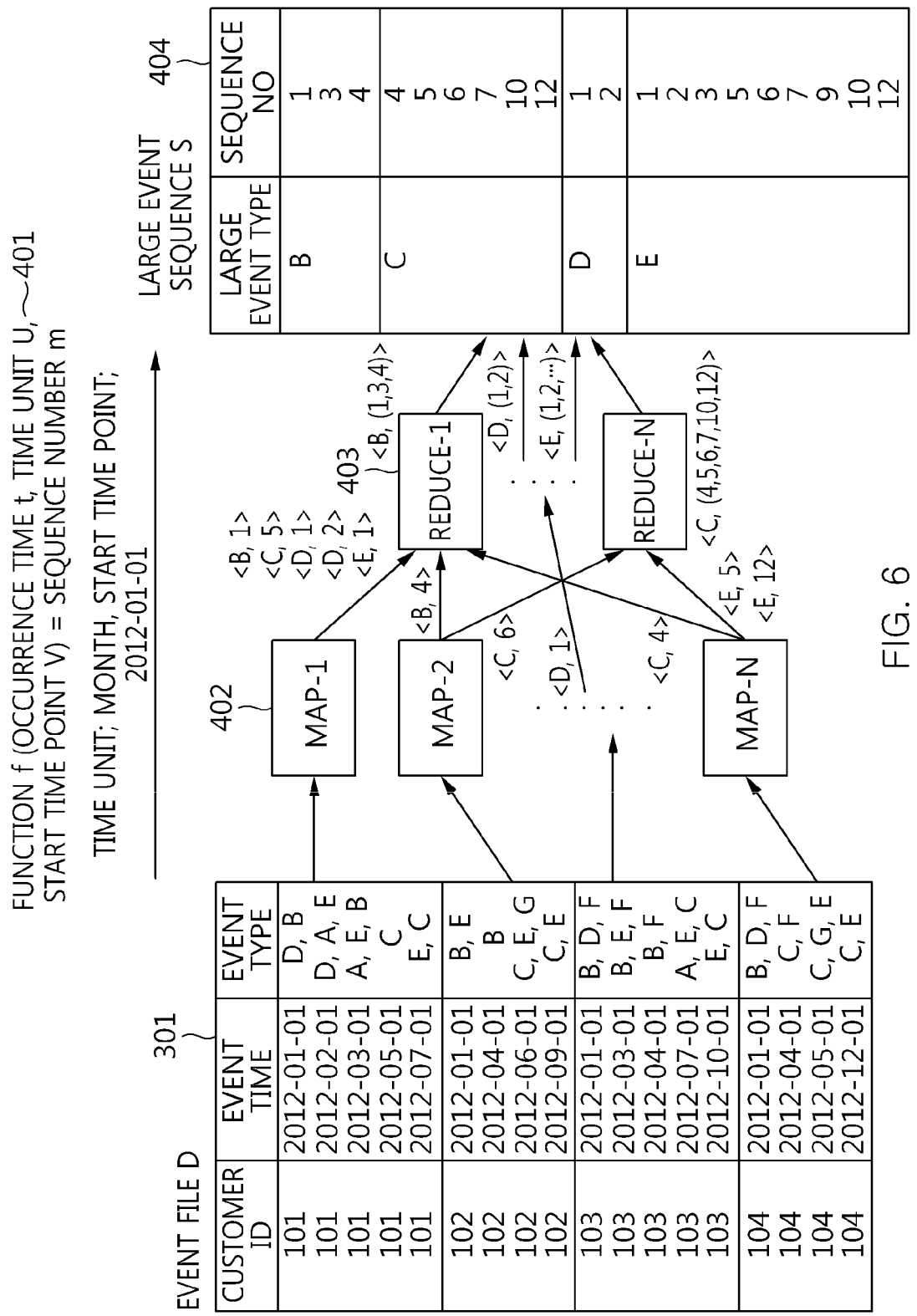
FIG. 6 is a diagram showing processing logic for performing a sequence conversion step according to an embodiment of the present invention.

FIG. 6 is a diagram showing processing logic for performing the sequence conversion step S203 according to an embodiment of the present invention.

Referring to FIG. 6, Map functions 402 are used to process the event file D 301 in parallel to extract event records belonging to LE={B,C,D,E}, and function f 401 is used to convert event times into sequence numbers.

Reduce functions 403 are used to combine LE sets converted into the sequence numbers in parallel and then generate a large event sequence S 404.

Thereafter, the large event sequence S is analyzed, and then the event file is summarized to and stored as a time interval data file.

Figure 7:
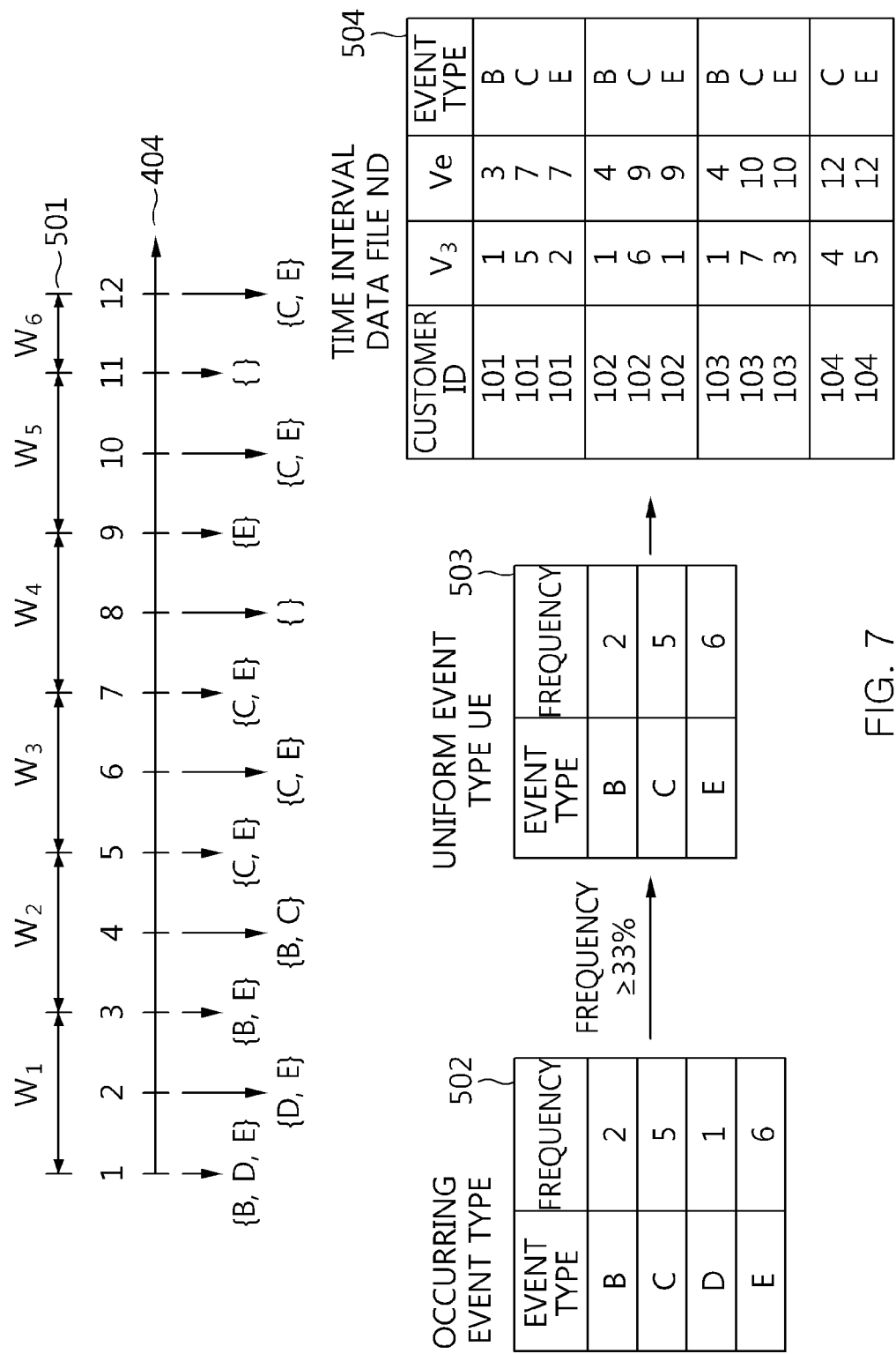
FIG. 7 is a diagram showing processing logic for performing a data summarization step according to an embodiment of the present invention.

FIG. 7 is a diagram showing processing logic for performing the data summarization step according to an embodiment of the present invention.

Referring to FIG. 7, sequence S is divided into windows 501, and the frequency of LE 502 occurring in each window is calculated from S. Thereafter, a uniform event type set 503 UE={B,C,E} having a minimum frequency $Freq_{min}$ or more is searched for.

For example, UE satisfying an occurrence frequency of 33% or more is extracted, which means that UE has occurred in two or more of a total of six windows, each having a window size of 2.

If UE has been extracted, the event file D 301 is summarized to a time interval data file ND 504 with reference to UE, and is distributed to and stored in a plurality of nodes through a distributed file system.

Figure 8:
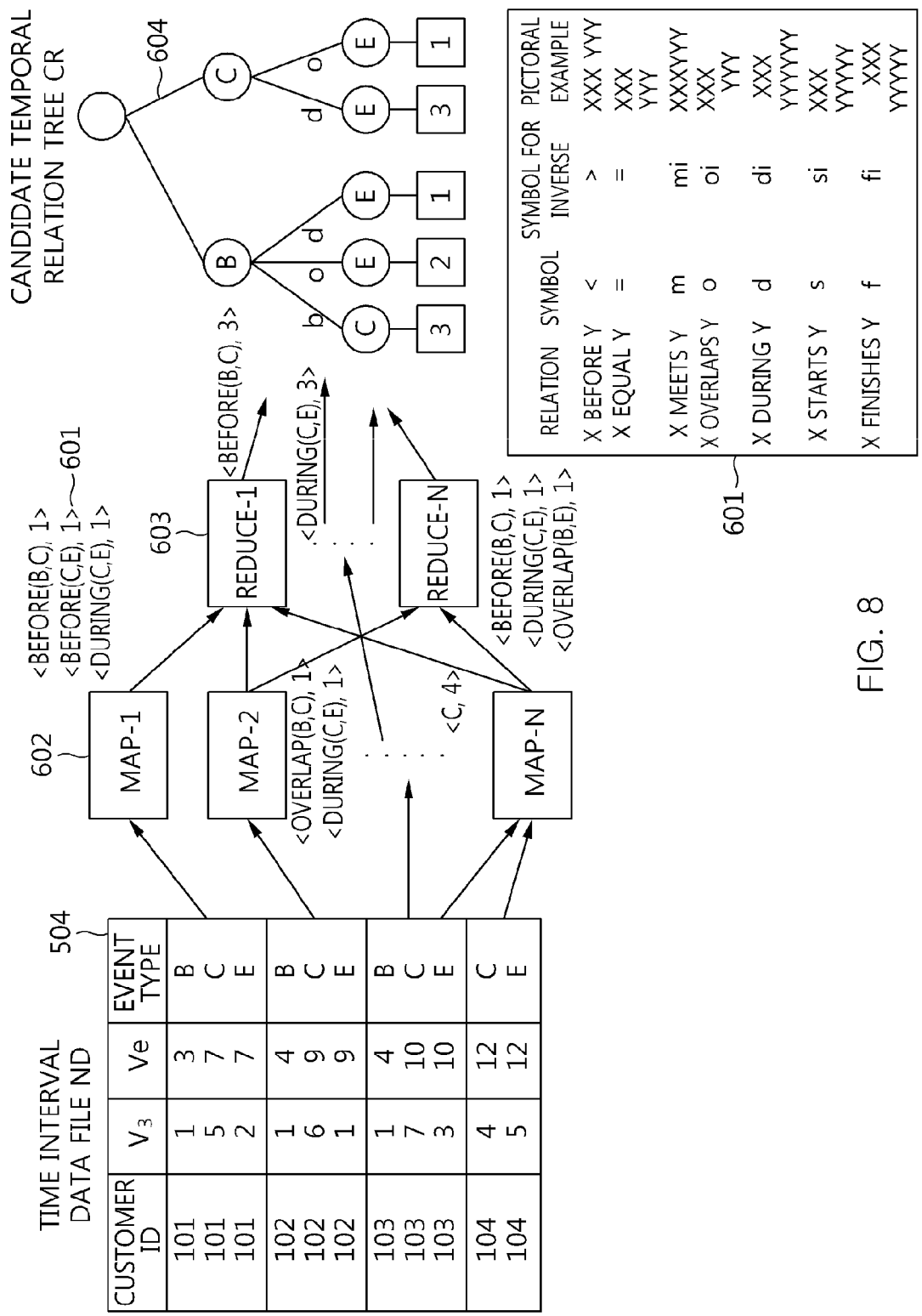
FIG. 8 is a diagram showing processing logic for performing a temporal relation extraction step according to an embodiment of the present invention.

FIG. 8 is a diagram showing processing logic for performing the temporal relation extraction step according to an embodiment of the present invention.

Referring to FIG. 8, Map functions 602 are used to obtain a candidate temporal relation set CR={$R_1$(B,C), $R_2$(C,E), ..., and $R_k$(B,E)} in parallel using a temporal relation table 601 from the time interval data file ND 504, and Reduce functions 603 are used to calculate the support of CR in parallel. Reference numeral 604 denotes CR obtained from ND, and is represented by a tree structure.

Nodes denote event types, connection lines denote temporal relations between two events, and leaf nodes (indicated by rectangles) denote the supports of temporal relations. Candidate temporal relations obtained here include before (B,C), during (C,E), overlap (C,E), etc.

Tree generation methods are implemented such that, if an existing temporal relation is present while a file ND is scanned, a support is increased, and such that, if a new temporal relation is generated, a node and a connection line are added, and thus a tree is dynamically generated.

By using this tree structure, a space in which temporal relations are stored can be greatly decreased. If N event types are present in the file ND, the size of a space required to store temporal relations in a matrix structure is N×N, and then the temporal relations are stored in a tree structure so that an unnecessary space is not wasted.

Further, a tree is a data structure enabling large-capacity data to be efficiently managed, thus rapidly processing tasks for searching the tree for stored temporal relations and increasing the supports of the temporal relations.

In this case, a frequent temporal relation FR is obtained from the generated candidate temporal relations CR, and a temporal relation rule TR is generated from the FR.

Figure 9:
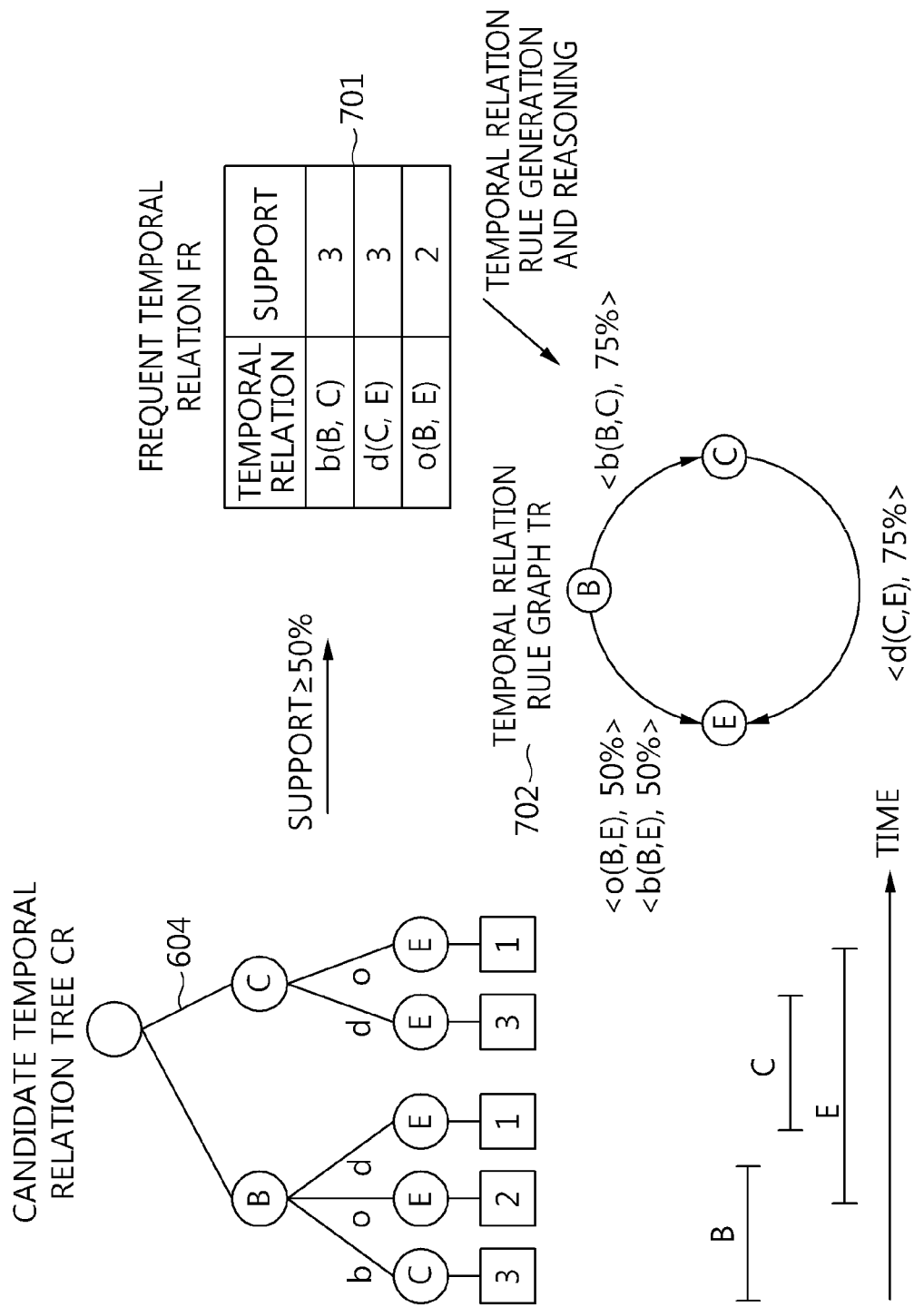
FIG. 9 is a diagram showing processing logic for performing a temporal relation rule generation step according to an embodiment of the present invention.

FIG. 9 is a diagram showing processing logic for performing the time rule generation step according to an embodiment of the present invention.

Referring to FIG. 9, a frequent temporal relation set 701 FR={$R_1$(x,y), $R_2$(x,y), ..., $R_k$(x,y)} having a minimum support $Supp_{min}$ or more is obtained from a CR tree 604 in which candidate temporal relations are stored. Thereafter, a temporal relation rule $\{TR_1, TR_2, \ldots, T_n\}$ is generated from FR and is then stored in the form of a graph 702.

When $Supp_{min}$ is 50%, FR is {before (B,C), during (B,C), overlap (B,E)}. Temporal relation rule TR (B,C,E) is generated from FR in the form of a connective combination of FR, that is, before (B,C)|0.75 ∧ during (C,E)|0.75 ∧ overlap (B,E)|0.5.

Further, a new before (B,E) relation is reasoned and generated from a relation between before (B,C) and during (C,E).

The temporal relation rule graph TR (B,C,E) is stored in the form of a Directed Acyclic Graph (DAG), wherein nodes indicate event types and connection lines indicate frequent temporal relations occurring between two events. By means of DAG, the temporal relation rule may be more easily understood.

Figure 10:
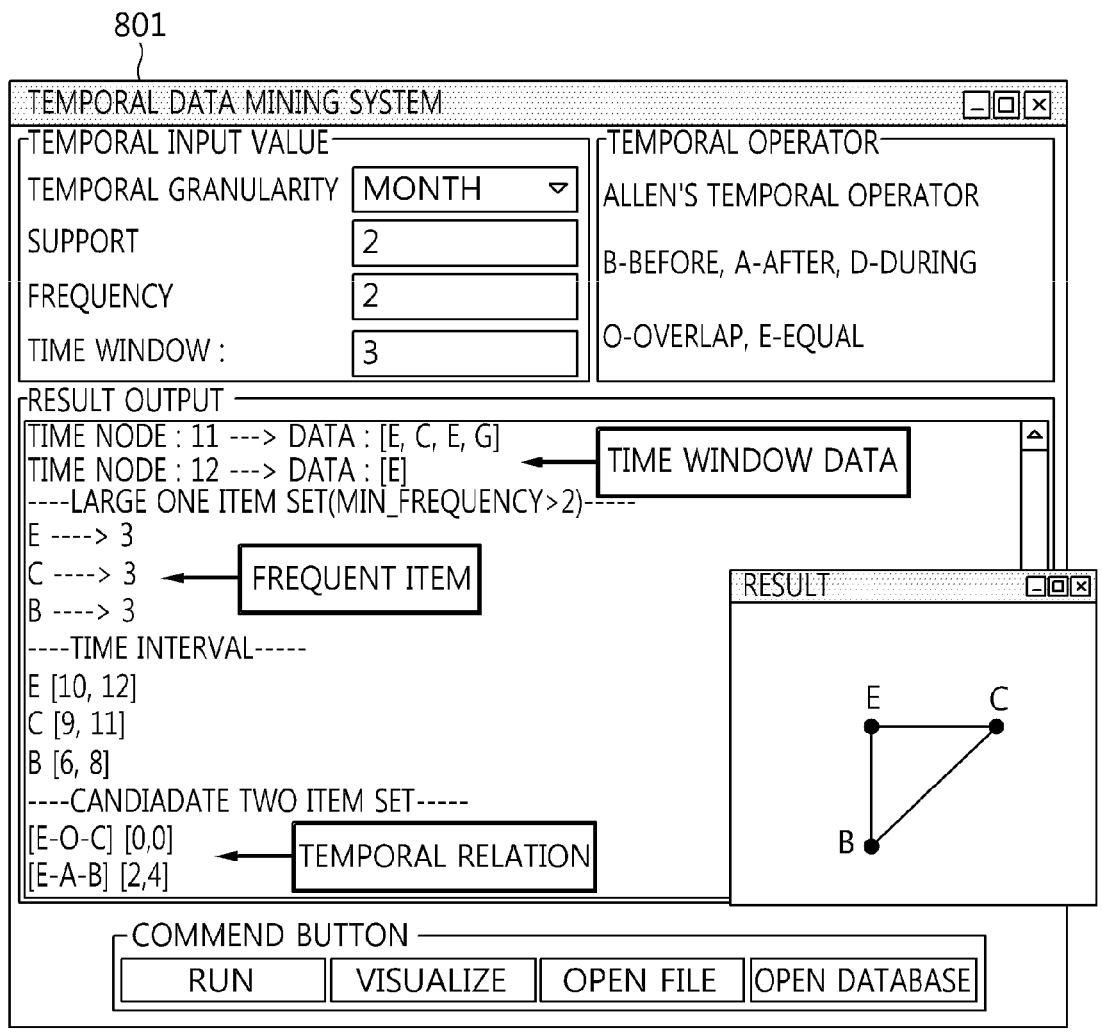
FIG. 10 is a diagram showing an example in which an algorithm of a method for parallel mining of temporal relations in a large event file according to an embodiment of the present invention is implemented using software and verified.

FIG. 10 is a diagram showing an example in which an algorithm of the method for parallel mining of temporal relations in a large event file according to an embodiment of the present invention is implemented using software and verified.

In accordance with embodiments of the present invention, a temporal relation mining scheme is applied from time interval data, and thus useful temporal relation rules that cannot be found by conventional analysis methods, such as sequential pattern analysis, can be mined Further, useful temporal relations can be mined from various event files, such as Radio Frequency Identification (RFID) and sensor data.

Furthermore, temporal relation rules can be rapidly and inexpensively mined from a large event file using a MapReduce model.

Furthermore, a method of summarizing event data to time interval data and a method of storing and processing temporal relations in the form of a tree structure are provided, thus greatly saving a storage space and shortening a processing time.

Although the configuration of the present invention has been described with reference to the preferred embodiments of the present invention, those skilled in the art will appreciate that the present invention can be implemented in other detailed forms without departing from the technical spirit or essential features of the invention. For example, the present invention can be implemented in various MapReduce systems including Hadoop system in which a program for implementing the method for parallel mining of temporal relations in a large event file according to the present invention is recorded. Therefore, the above-described embodiments should be understood to be exemplary rather than restrictive in all aspects. Further, the scope of the present invention is defined by the accompanying claims rather than the detailed description of the invention. Furthermore, all changes or modifications derived from the scope and equivalents of the claims should be interpreted as being included in the scope of the present invention.

What is claimed is:

1. A method for parallel mining of temporal relations in a large event file, comprising:
    aligning an event file based on customer identification (ID) and event time at which each event has occurred;
    generating a set of large event types satisfying a preset support or more from the event file;
    converting the event file into a large event sequence including the large event type set;
    summarizing the large event sequence and then creating a time interval data file;
    generating candidate temporal relations from the time interval data file, and deriving frequent temporal relations satisfying a preset support or more from the candidate temporal relations; and
    generating a temporal relation rule from the derived frequent temporal relations,
    wherein converting the event file into the large event sequence comprises:
    extracting event records belonging to the large event types by processing the event file in parallel using a Map function;
    converting event times at which the events have occurred into sequence numbers; and
    generating the large event sequence by combining large events type sets, event times of which are converted into sequence numbers, in parallel using a Reduced function.

2. The method of claim 1, wherein aligning the event file is configured to distribute and store the event file to and in a plurality of nodes using a distributed file system.

3. The method of claim 1, wherein generating the set of the large event types is configured to determine a set of candidate event types, for which a total number of supporting customers is a preset minimum support or more, among one or more candidate event types to be the large event type set.

4. The method of claim 3, wherein:
    the candidate event types are extracted by processing the event file in parallel using a Map function, and
    supports of the candidate event types are calculated in parallel using a Reduce function.

5. The method of claim 1, wherein converting the event times at which the events have occurred into the sequence numbers comprises:
    converting the event times at which the events have occurred into sequence numbers based on a preset time unit; and
    calculating periods from a preset reference time point to the converted event times, thus generating sequence numbers.

6. The method of claim 5, wherein the large event sequence includes event types and sequence numbers of the event types.

7. The method of claim 1, wherein creating the time interval data file comprises:
    calculating frequencies of one or more large event types occurring within a time window having a preset size; and
    generating a set of uniform event types by selecting large event types, frequencies of which are a preset minimum frequency or more, and creating a time interval data file including the uniform event type set.

8. The method of claim 7, wherein the time interval data file is a set of records, each including fields corresponding to a customer ID, a start point of a time interval, an end point of the time interval, and an event type.

9. The method of claim 8, wherein the event file is summarized to the time interval data file with reference to the uniform event type set, and is distributed to and stored in a plurality of nodes through a distributed file system.

10. The method of claim 1, wherein deriving the frequent temporal relations is configured to obtain sets of candidate temporal relations in parallel from the time interval data file using a Map function and a temporal relation table, and calculating supports of the candidate temporal relations in parallel using a Reduce function.

11. The method of claim 10, wherein a set of candidate temporal relations, for which a total number of supporting customers is a preset minimum support or more, among one or more candidate temporal relations, is determined to be a frequent temporal relation set.

12. The method of claim 11, wherein the candidate temporal relations are generated in a tree shape in such a way as to increase a support if an existing temporal relation is present while the time interval data file is scanned, and add a node and a connection line in which a new temporal relation is generated.

13. The method of claim 11, wherein the temporal relation rule is derived from the frequent temporal relations using the following Equation:

$$TR(e_1,e_2,e_3)=R_1(e_1,e_2)|supp(R_1) \wedge R_2(e_2,e_3) |supp(R_2) \wedge R_3(e_1,e_3)|supp(R_3)$$

(where $e_1$, $e_2$, and $e_3$: event types, TR: temporal relation rule, $R_1$, $R_2$, and $R_3$: candidate temporal relations, supp: support of candidate temporal relation).

\* \* \* \* \*